(12) United States Patent
Okamura et al.

(10) Patent No.: US 9,649,692 B2
(45) Date of Patent: May 16, 2017

(54) SINTERED CUBIC BORON NITRIDE COMPACT TOOL

(71) Applicant: SUMITOMO ELECTRIC HARDMETAL CORP., Itami-shi, Hyogo (JP)

(72) Inventors: Katsumi Okamura, Itami (JP); Kunishige Tanaka, Itami (JP); Satoru Kukino, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 171 days.

(21) Appl. No.: 14/382,625

(22) PCT Filed: Apr. 9, 2013

(86) PCT No.: PCT/JP2013/060689
§ 371 (c)(1),
(2) Date: Sep. 3, 2014

(87) PCT Pub. No.: WO2013/161558
PCT Pub. Date: Oct. 31, 2013

(65) Prior Publication Data
US 2015/0016902 A1    Jan. 15, 2015

(30) Foreign Application Priority Data

Apr. 23, 2012   (JP) ................................. 2012-097760

(51) Int. Cl.
| | | |
|---|---|---|
| *B23B 27/00* | (2006.01) | |
| *B23B 27/14* | (2006.01) | |
| *B23C 5/20* | (2006.01) | |

(52) U.S. Cl.
CPC .......... *B23B 27/145* (2013.01); *B23B 27/148* (2013.01); *B23C 5/202* (2013.01);
(Continued)

(58) Field of Classification Search
CPC ........ B23C 2200/323; B23C 2200/326; B23C 2200/081; B23C 2200/086; B23C 2200/087
See application file for complete search history.

(56) References Cited

U.S. PATENT DOCUMENTS 4,087,193 A  *  5/1978  Mundy ................. B23B 27/141
                                                  407/114
4,655,648 A  *  4/1987  Hellbergh ................. B23C 5/16
                                                  144/218
(Continued)

FOREIGN PATENT DOCUMENTS

CN    102228998 A    11/2011
JP    U-55-26622     2/1980
(Continued)

OTHER PUBLICATIONS

Oct. 26, 2015 Extended Search Report issued in European Patent Application No. 13780604.8.
(Continued)

*Primary Examiner* — Will Fridie, Jr.
(74) *Attorney, Agent, or Firm* — Oliff PLC

(57) ABSTRACT

A tool includes, at least on its edge, a sintered cBN compact which includes cBN particles and a bonding phase, a plurality of flutes is formed on a rake face, each of the flutes having a starting end on the edge ridgeline and causing the edge ridgeline to be wavy, and the terminal end of the flute is disposed inwardly of the edge ridgeline. It is preferable that the flute width of the flute decreases with distance from the edge ridgeline, the flute depth of the flute decreases with distance from the edge ridgeline, and the rake face has a positive rake angle.

4 Claims, 2 Drawing Sheets

(52) U.S. Cl.
CPC . *B23B 2200/0447* (2013.01); *B23B 2200/086* (2013.01); *B23B 2200/201* (2013.01); *B23B 2200/205* (2013.01); *B23B 2222/36* (2013.01); *B23B 2226/125* (2013.01); *B23C 2200/086* (2013.01); *B23C 2226/125* (2013.01); *Y10T 407/245* (2015.01)

(56) References Cited

U.S. PATENT DOCUMENTS

| | | | | |
|---|---|---|---|---|
| 5,074,720 | A * | 12/1991 | Loqvist | B23C 5/202 407/114 |
| 5,405,711 | A * | 4/1995 | Noggle | B23B 27/143 407/114 |
| 5,722,803 | A * | 3/1998 | Battaglia | B23B 27/146 407/115 |
| 6,601,620 | B1 * | 8/2003 | Monyak | A01G 23/067 144/24.12 |
| 8,246,278 | B2 * | 8/2012 | Horiike | B23C 5/109 407/113 |
| 2004/0265075 | A1 * | 12/2004 | Kolker | B23B 27/145 407/113 |
| 2008/0031698 | A1 | 2/2008 | Pitonak et al. | |
| 2008/0199263 | A1 | 8/2008 | Jonsson et al. | |
| 2011/0070040 | A1 | 3/2011 | Park et al. | |
| 2012/0034041 | A1 * | 2/2012 | Koga | B23C 5/06 407/103 |
| 2014/0212231 | A1 * | 7/2014 | Kovac | B23C 5/205 407/114 |
| 2014/0219734 | A1 * | 8/2014 | Hoffer | B23C 5/003 407/64 |

FOREIGN PATENT DOCUMENTS

| | | |
|---|---|---|
| JP | Y2-6-7856 | 9/1987 |
| JP | A-11-58087 | 3/1999 |
| JP | A-2000-140990 | 5/2000 |
| JP | A-2000-288803 | 10/2000 |
| JP | A-2009-202283 | 9/2009 |
| JP | A-2010-532271 | 10/2010 |
| JP | A-2011-189421 | 9/2011 |
| WO | 01/60552 A1 | 8/2001 |
| WO | WO 2009/005218 A1 | 1/2009 |

OTHER PUBLICATIONS

Sugihara et al., "Development of a Highly-Functional Cutting Tool with Micro-Textured Surface Cutting of Steel Materials," *Proceeding of Academic Lectures at the 2009 Autumn Conference of the Japan Society for Precision Engineering*, 2009, pp. 125-126 (with abstract).

Aoki et al., "Study on Chip Control in Turning with Guide Grooves on Tool Rake," *Proceeding of Academic Lectures at the 2009 Autumn Conference of the Japan Society for Precision Engineering*, 2009, pp. 111-112 (with abstract).

International Search Report issued in International Application No. PCT/JP2013/060689 mailed Jul. 2, 2013.

* cited by examiner

SINTERED CUBIC BORON NITRIDE COMPACT TOOL

TECHNICAL FIELD

The present invention relates to a sintered cubic boron nitride (hereinafter, referred to as cBN) compact tool that is composed of a sintered cubic boron nitride compact in which a cutting edge is formed with cubic boron nitride particles and a bonding phase. Particularly, the present invention relates to a sintered cubic boron nitride compact tool that reduces boundary damage and flank face wear of a side cutting edge in machining a heat resistant alloy and achieves long life.

BACKGROUND ART

In contrast to conventional tool material such as a cemented carbide tool, a sintered cBN compact tool has excellent chemical stability, and high material performance characteristics due to low affinity for iron and high hardness, the performance characteristics capable of achieving long life with high efficiency. In addition, the sintered cBN compact tool has excellent flexibility far superior to that of a grinding tool which is a plastic working tool such as a cutting tool. The sintered cBN compact tool also has a reputation for low environmental load, and thus a conventional tool has been replaced by the sintered cBN compact tool in machining hard-to-machine iron-based material.

On the other hand, a cemented carbide tool, which is normally used in machining an Ni-based heat resistant alloy or an iron-based heat resistant alloy, has a cutting speed of approximately 50 m/min and the cutting speed can be increased up to approximately 80 m/min at most. For this reason, high speed cutting of 200 m/min or higher is being studied, in which a sintered cBN compact tool having excellent high temperature hardness is used. However, the problem in the case where a heat resistant alloy is cut with a sintered cBN compact tool is that fracture occurs at a side cutting edge, and at present, the reliability of the tool is not sufficiently ensured.

In view of such a situation, as described in the below-mentioned PTL 1, an attempt is made in which heat generated at the edge is efficiently distributed over a workpiece side by reducing the thermal conductivity of a sintered cBN compact, and thus the hardness of the workpiece is decreased to improve machinability, thereby reducing boundary fracture of the side cutting edge.

In addition, as described in the below-mentioned NPL 1 and PTL 2, adhesion resistance is attempted to be improved by forming a fine bumpy structure on the tool surface as a contrivance in the shape.

Furthermore, in NPL 2, chip flow is attempted to be controlled by forming a flute of 0.05 mm on the rake face of the tool. However, even with the contrivance in the shape like the above, it was not possible to achieve reduction in fracture of the side cutting edge of a sintered cBN compact tool in machining a heat resistant alloy.

CITATION LIST

Patent Literature

PTL 1: Japanese Unexamined Patent Application Publication No. 11-58087

PTL 2: Japanese Unexamined Patent Application Publication No. 2000-140990

Non Patent Literature

NPL 1: Proceeding of Academic Lectures at the 2009 Autumn Conference of the Japan Society for Precision Engineering, (2009) pp. 125-126.

NPL 2: Proceeding of Academic Lectures at the 2009 Autumn Conference of the Japan Society for Precision Engineering, (2009) pp. 111-112.

SUMMARY OF INVENTION

Technical Problem

It is an object of the present invention to reduce boundary damage of a side cutting edge in high speed machining of a heat resistant alloy, that is a drawback of a sintered cBN compact tool so as to achieve improvement in the reliability and long life of the tool.

Solution to Problem

The inventors of the present application have investigated the cause of occurrence of boundary damage of a side cutting edge using Inconel 718 which is the most general-purpose material in the Ni-based heat resistant alloy. As a result, the inventors have found that adhesion occurs at the side cutting edge and a sintered cBN compact along with a chip flow is chipped in the outflow direction (direction nearly perpendicular to a tangent at each point of the cutting edge) of the chip. Furthermore, the inventors have found that degree of adhesion significantly depends on the shape of the cutting edge ridgeline and have completed a sintered cBN compact tool that is effective in solving the above-mentioned problem.

The sintered cBN (cubic boron nitride) compact tool of the present invention, completed based on the above-mentioned findings is a tool having, at least on the edge, a sintered cBN compact which includes cBN particles and a bonding phase, and a plurality of flutes is formed on the rake face, each of the flutes having a starting end on the edge ridgeline (cutting edge) and causing the edge ridgeline to be wavy. Also, the terminal end of each flute is disposed inwardly of the edge ridgeline.

It is preferable that the width of the above-mentioned flutes provided on the rake face is 10 to 100 µm, the flute depth is 10 to 50 µm, the width of each flute decreases with distance from the edge ridgeline, the depth of the flute decreases with distance from the edge ridgeline, and the rake face has a positive rake angle.

In addition, it is preferable that the average particle diameter of the cBN particles included in the sintered cBN compact is 2 µm or less and the thermal conductivity of the sintered cBN compact is 70 W/m·K or lower.

Advantageous Effects of Invention

The sintered cBN compact tool of the present invention has the above-described configuration, thereby reducing boundary damage of the side cutting edge in high speed machining of a heat resistant alloy and achieving improvement in the reliability and long life. The reason for this will be described later.

DESCRIPTION OF EMBODIMENTS

Hereinafter, a sintered cBN compact tool which is an example of the present invention will be described. As described above, the sintered cBN compact tool as an example of the present invention features to have, at least on its edge, a sintered cBN compact which includes cBN particles and a bonding phase, a plurality of flutes is formed on the rake face, each of the flutes having a starting end on the edge ridgeline, and the terminal end of the flute is disposed inwardly of the edge ridgeline.

Figure 1:
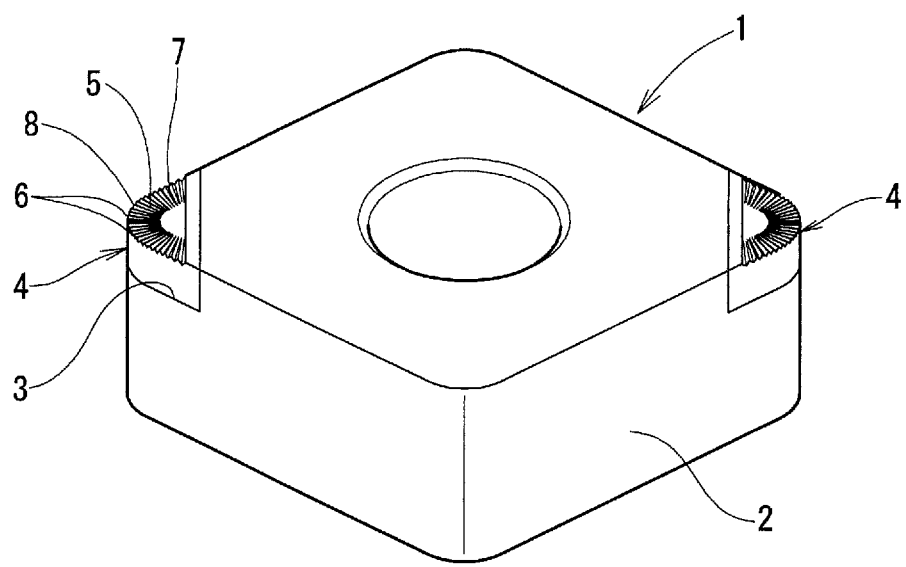
FIG. 1 is a perspective view illustrating an example of a sintered cBN compact tool of the present invention.
Figure 2:
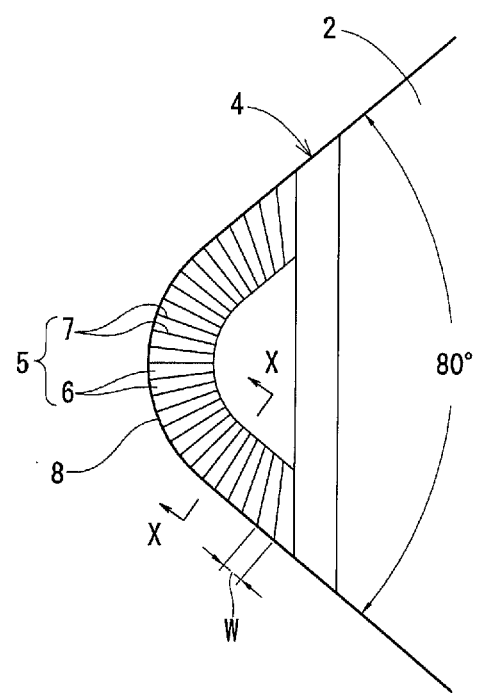
FIG. 2 is an enlarged plan view of an edge side of the sintered cBN compact tool of FIG. 1.
Figure 3:
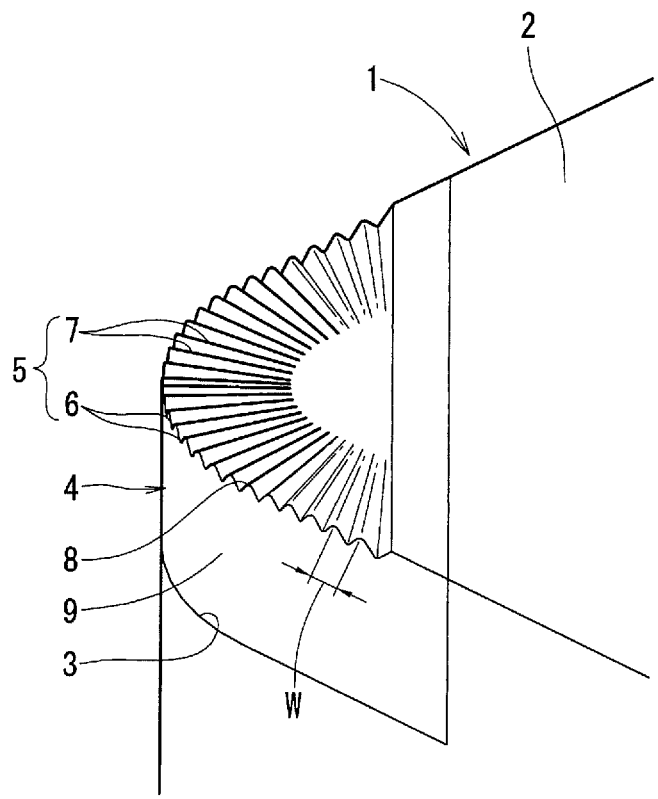
FIG. 3 is an enlarged perspective view of the edge side of the sintered cBN compact tool of FIG. 1.
Figure 4:
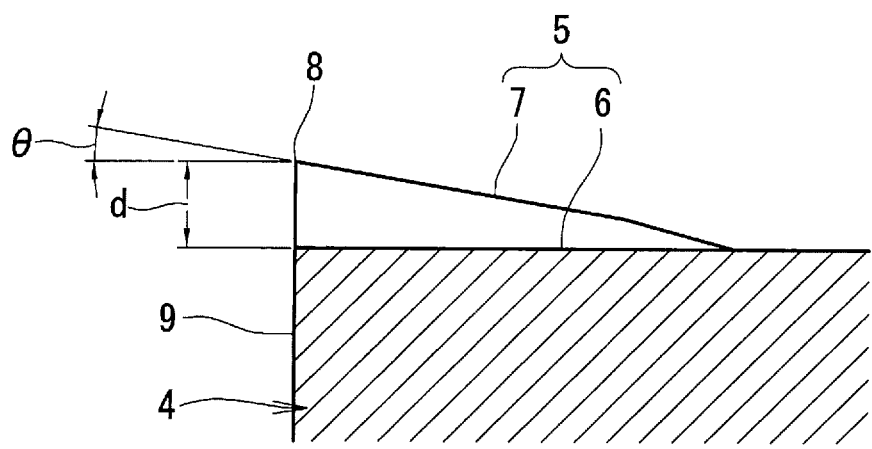
FIG. 4 is an enlarged cross-sectional view at a position along line X-X of FIG. 2.

An example of the sintered cBN compact tool having the above feature is illustrated in FIGS. 1 to 4. A sintered cBN compact tool 1 illustrated as an example is a rhombus negative cBN edge exchange type insert that uses an acute angle corner portion as an edge. In the sintered cBN compact tool 1, the acute angle corner portion of a base metal 2 is provided with a down layered support seat 3, the support seat 3 is bonded to a sintered cBN compact 4, and a rake face 5 of the sintered cBN compact 4 is provided with a plurality of flutes 6. A ridge (projecting portion) 7 is formed between adjacent flutes 6, 6.

In each of the flutes 6, the starting end is on an edge ridgeline (cutting edge at the acute angle corner portion) 8. Also, the flute 6 extends from the edge ridgeline 8 in a direction nearly perpendicular to the tangent at a corresponding point of the edge ridgeline 8, and the terminal end is located inwardly of the edge ridgeline 8. Furthermore, a flute width W (see FIG. 2 and FIG. 3) decreases with distance from the edge ridgeline 8. Moreover, a flute depth d (see FIG. 4) decreases with distance from the edge ridgeline 8, and the flutes are radially disposed in an area with a certain width along the edge ridgeline 8 in a plan view of the insert.

Also, the rake face 5 is a face that has a positive rake angle θ (see FIG. 4) of approximately 15°.

In the sintered cBN compact tool 1 of the present invention, configured in this manner, the flutes 6 formed on the rake face 5 cause the edge ridgeline 8 to be wavy, and thus the contact area of generated chip is decreased and adhesion is inhibited.

The terminal ends of the flutes 6 are disposed inwardly of the edge ridgeline 8, the ridge 7 between flutes 6, 6, with directly facing a flank face 9 of the side cutting edge, extends in the directly-facing direction, and thus the cross-sectional shape of the generated chip is what is transferred from the wavy shape of the edge ridgeline 8 (cutting edge). Because the chip having a wavy cross-section is narrowed as the flute width W is more apart from the edge ridgeline 8, the outflow speeds at the bottom of the flutes 6 and the ridgeline side of the ridge 7 vary, whereby a shearing force is applied and the chip is bent, and also a contact pressure with the rake face 5 reduces, a contact area decreases due to promoted shearing, and thus a tensile stress generated at the side cutting edge also reduces. It is estimated that a synergistic effect from these causes chipping to be inhibited.

Because the flute depth d is made to decrease with distance from the edge ridgeline 8, a shearing force applied to the chip is increased. In addition, the rake face 5 having a positive rake angle with a low outflow resistance of the chip and a guidance effect of the flutes 6 cause smooth discharge of the chip, thereby achieving reduction in adhesion and further reduction in chipping of the side cutting edge.

When the flute width W, the flute depth d of the flutes 6 provided on the rake face 5 are less than 10 μm, a difference hardly occurs between the outflow speeds at the flute bottom and the ridgeline side of the ridge 7, and thus the reducing effect on chipping of the side cutting edge is low. When the flute width W exceeds 100 μm, it is difficult to form one pitch in a wavy shape at the position of the side cutting edge. When the flute depth d exceeds 50 μm, the strength of a projecting portion is reduced and chipping is likely to occur. Consequently, it is preferable that the flute width W is 10 to 100 μm and the flute depth d is 10 to 50 μm.

It is preferable that the average particle diameter of the cBN particles included in the sintered cBN compact 4 is 2 μm or less and the thermal conductivity of the sintered cBN compact 4 is 70 W/m·K or lower. When the average particle diameter of the cBN particles included in the sintered cBN compact 4 exceeds 2 μm, the thermal conductivity of the sintered cBN compact tends to increase. In order to regulate the thermal conductivity to be lower than or equal to 70 W/m·K, it is necessary to reduce the content rate of the cBN particles, and as a consequence, the strength of the sintered cBN compact is reduced, which is not preferable.

The above-described flutes 6 can be formed by adjusting parameters such as a beam diameter, a pulse width, an output, and a pitch width using a YAG laser or a picosecond laser.

The present invention is also applicable to a sintered cBN compact tool to which coating such as TiAlN, TiCN, AlCrN, TiAlCrN, TiAlSiN is applied for increasing wear resistance.

EXAMPLES

Example 1

A sintered cBN compact tool was produced as follows. First, WC powder having an average particle diameter of 1.2 μm, Co powder having an average particle diameter of 1.5 μm, and Al powder having an average particle diameter of 2 μm were mixed with a mass ratio of WC:Co:Al=40:50:10 and heat treated for 30 minutes at 1100° C. in a vacuum, and a resultant compound was pulverized using a cemented carbide ball having φ4 mm so as to obtain a bonding material.

Subsequently, powder of the bonding material and cBN particles having an average particle diameter of 0.5 μm were prepared, mixed, and dried so that the cBN rate after sintering is 75 volume %.

Furthermore, the powder is stacked on a cemented carbide support plate, and was filled into an Mo capsule, then was sintered for 30 minutes at a temperature of 1350° C. at a pressure of 6.5 GPa by an ultra-high pressure device.

The thermal conductivity of the obtained sintered cBN compact was then measured by a laser flash method, and as a result of calculation based on the specific heat and density of the sintered cBN compact which were calculated by another method, the thermal conductivity was found to be 50.5 W/m·K.

Next, using the sintered cBN compact of this trial product, a rhombus negative cBN edge exchange type insert (sintered cBN compact tool) with ISO model number CNGA120408 (side length of 12.7 mm, corner angle of 80° at the edge corner, entire thickness of 4.76 mm) was produced with the sintered CBN compact bonded to the acute angle corner portion of the base metal. The edge was formed in a shape using a YAG laser such that a flute width is 50 μm and a flute depth is 30 μm, the flute depth decreases with distance from the edge ridgeline, and the rake face has a positive rake angle of 15°. The conditions of the YAG laser were as follows: a machining speed of 500 mm/s, a frequency of 50 kHz, an output of 6.0 W, a beam diameter of 80 μm, and a pitch width of 0.01 mm.

Example 2

Rhombus negative cBN edge exchange type inserts (Inventions 2 to 6 illustrated in Table I) were produced by the same method as in EXAMPLE 1 where the flute width, the flute depth, and the rake angle of the rake face were changed but other specifications were the same as in EXAMPLE 1. Invention 1 of Table I is the tool which was produced in EXAMPLE 1.

Furthermore, using each cutting tool which was prepared by mounting one of the rhombus negative cBN edge exchange type inserts of Inventions 1 to 6 and Comparative Example 1 on a holder, outer peripheral cutting was performed on Inconel (trademark of INCO, Ni-based alloy) 718 as a workpiece with cutting speed of 300 m/min, depth of cut of 0.2 mm, and feed rate of 0.1 mm/rev. Table I illustrates the shapes and results of the cutting for Inventions 1 to 6 and Comparative Example 1. Comparative Example 1 is a sintered cBN compact tool in which the rake face is not provided with flutes.

TABLE I

| | Flute width(μm) | Flute depth(μm) | Rake angle (+sign indicates a positive rake angle) | Chipping size at side cutting edge in a chip outflow direction at a point of 0.2 km (mm) | Cutting distance when the chipping size of side cutting edge in a chip outflow direction exceeds 0.2 mm (km) |
|---|---|---|---|---|---|
| Invention 1 | 50 | 30 | +15 | 0 | 1.5 |
| Invention 2 | 10 | 30 | +15 | 0.01 | 1.38 |
| Invention 3 | 100 | 30 | +15 | 0.02 | 1.34 |
| Invention 4 | 50 | 10 | +15 | 0.05 | 1.15 |
| Invention 5 | 50 | 50 | +15 | 0 | 1.43 |
| Invention 6 | 50 | 30 | 0 | 0.03 | 1.36 |
| Comparative example 1 | — | — | 0 | 0.13 | 0.35 |

As seen from the test result, in contrast to Comparative Example 1, chipping at the side cutting edge is inhibited in Inventions 1 to 6, and the tool life in the case where life evaluation criterion is set with respect to a chipping size of 0.2 mm is extended 3 times or more the tool life in Comparative Example 1.

Example 3

A rhombus negative cBN edge exchange type insert (Invention 7 illustrated in Table II) with cBN particles having an average particle diameter of 2 μm and a cBN rate of 80 volume %, and a rhombus negative cBN edge exchange type insert (Invention 8 illustrated in Table II) with cBN particles having an average particle diameter of 4 μm and a cBN rate of 90 volume % were produced by the same method as in EXAMPLE 1. Other specifications for these tools were the same as in Invention 1. The thermal conductivity of Invention 7 was 70 W/m·K and the thermal conductivity of Invention 8 was 120 W/m·K.

Next, using each cutting tool which was prepared by mounting one of the sintered cBN compact tools of Inventions 1, 7, 8 on a holder and the cutting tool of Comparative Example 2, outer peripheral cutting was performed on the above-mentioned Inconel 718 with cutting speed of 100 m/min, depth of cut ap of 0.2 mm, and feed rate f of 0.1 mm/rev. Table II illustrates the result of the cutting. Comparative Example 2 is a commercial sintered cBN compact tool (cBN rate of 60 volume %, bonding phase of TiN) in which the rake face is not provided with flute shapes.

TABLE II

| | Chipping size at side cutting edge in a chip outflow direction at a point of 0.2 km (mm) | Cutting distance when the chipping size of side cutting edge in a chip outflow direction exceeds 0.2 mm (km) |
|---|---|---|
| Invention 1 | 0 | 2.25 |
| Invention 7 | 0 | 1.98 |
| Invention 8 | 0.06 | 1.65 |
| Comparative example 2 | 0.45 | 0.2 |

From this test result, it can be seen that a tool having a lower thermal conductivity has a longer tool life. This is because when a sintered cBN compact has a lower thermal conductivity, it is estimated that shearing heat generated at the edge is distributed to the workpiece side and the chip side at a higher rate, thereby softening the workpiece and the chip and causing smooth discharge of the chip, and occurrence of chipping at the side cutting edge is inhibited.

It is to be noted that the sintered cBN compact tool of the present invention is not limited to the tools shown in EXAMPLES. It is cost-effective to provide a tool in which only the edge of the tool is configured of a sintered cBN compact, but the entire tool may be configured of a sintered cBN compact.

Also, the width and depth of the flutes 6, the average particle diameter of the cBN particles included in the sintered cBN compact, and the thermal conductivity of the sintered cBN compact may be changed as appropriate to have different combinations from those in EXAMPLES.

REFERENCE SIGNS LIST

1 sintered cBN compact tool
2 base metal
3 support seat
4 sintered cBN compact
5 rake face
6 flute
7 ridge
8 edge ridgeline 9 flank face
W flute width
d flute depth

The invention claimed is:

1. A sintered cubic boron nitride compact tool having a polygonal shape with a corner such that the corner defines an arc, the compact tool comprising:
   a sintered cBN compact at least on an edge of the corner of the polygonal shape, the sintered cBN compact including a cubic boron nitride particle and a bonding phase,
   wherein a plurality of flutes is formed on a rake face of the arc of the corner such that the plurality of flutes are formed over the entire arc of the corner, each of the flutes has a starting end on an edge ridgeline such that the edge ridgeline is wavy, and a terminal end of each of the flutes is located inwardly of the edge ridgeline.

2. The sintered cubic boron nitride compact tool according to claim 1,
   wherein each of the flutes has a flute width of 10 to 100 µm and a flute depth of 10 to 50 µm, the flute width of the flutes decreases with distance from the edge ridgeline, the flute depth of the flutes decreases with distance from the edge ridgeline, and the rake face has a positive rake angle.

3. The sintered cubic boron nitride compact tool according to claim 1,
   wherein an average particle diameter of the cBN particle included in the sintered cBN compact is 2 µm or less, and a thermal conductivity of the sintered cBN compact is 70 W/m·K or lower.

4. The sintered cubic boron nitride compact tool according to claim 2,
   wherein an average particle diameter of the cBN particle included in the sintered cBN compact is 2 µm or less, and a thermal conductivity of the sintered cBN compact is 70 W/m·K or lower.

* * * * *